US006939046B2

United States Patent
Oelsch

(10) Patent No.: US 6,939,046 B2
(45) Date of Patent: Sep. 6, 2005

(54) HYDRODYNAMIC BEARING, SPINDLE MOTOR AND HARD DISK DRIVE

(75) Inventor: Juergen Oelsch, Hohenroth (DE)

(73) Assignee: Minebea Co., Ltd., Nagano (JP)

( * ) Notice: Subject to any disclaimer, the term of this patent is extended or adjusted under 35 U.S.C. 154(b) by 45 days.

(21) Appl. No.: 10/403,440

(22) Filed: Mar. 31, 2003

(65) Prior Publication Data

US 2004/0008911 A1 Jan. 15, 2004

(30) Foreign Application Priority Data

Jul. 15, 2002 (DE) ..................................... 202 11 587 U
Nov. 22, 2002 (DE) ..................................... 202 18 170 U

(51) Int. Cl.$^7$ .............................................. F16C 32/06
(52) U.S. Cl. ..................... 384/100; 384/107; 384/114; 384/121
(58) Field of Search ................................ 384/100, 107, 384/112, 114, 121, 123

(56) References Cited

U.S. PATENT DOCUMENTS

| | | | | |
|---|---|---|---|---|
| 4,348,065 A | * | 9/1982 | Yoshioka et al. ............ 384/121 |
| 5,667,309 A | * | 9/1997 | Nose ............................ 384/132 |
| 5,993,066 A | * | 11/1999 | Leuthold et al. ............. 384/113 |
| 6,176,618 B1 | * | 1/2001 | Kawawada et al. .......... 384/107 |
| 6,378,209 B1 | * | 4/2002 | Gomyo et al. ............ 29/898.02 |
| 6,717,310 B2 | * | 4/2004 | Yoshikawa et al. ........... 310/90 |
| 6,789,992 B2 | * | 9/2004 | Horng et al. ................ 411/534 |

* cited by examiner

Primary Examiner—Thomas R. Hannon
Assistant Examiner—Colby Hansen
(74) Attorney, Agent, or Firm—Joel Lutzker; Anna Vishev; Schulte Roth & Zabel LLP

(57) ABSTRACT

A hydrodynamic bearing having a shaft, which is fixedly connected at one end to a rotating component, and a bearing sleeve, which encompasses the shaft at its other free end with a slight clearance. The sleeve and the shaft form a concentric bearing gap. The shaft and/or the bearing sleeve is provided with at least one groove pattern which forms at least one radial hydrodynamic bearing. A volume equalizing cavity and at least one connecting passage connecting the bearing gap with the volume equalizing cavity extend radially outwards at an angle to the bearing gap.

23 Claims, 7 Drawing Sheets

HYDRODYNAMIC BEARING, SPINDLE MOTOR AND HARD DISK DRIVE

CROSS-REFERENCE TO RELATED APPLICATION

This application claims all rights of priority to German Patent Application Serial No. DE 202 18 170.7, filed Jul. 15, 2002 filed Nov. 22, 2002, and German Patent Application Serial No. DE 202 11 587.9, filed Jul. 15, 2002 (pending).

BACKGROUND

The invention relates to a hydrodynamic bearing for use in a spindle motor of a hard disk drive.

A spindle motor for a hard disk drive generally consists of a rotating component, a rotor, having an annular permanent magnet, and a stationary component, a stator, having a stator stack wound with coils, wherein the rotor is equipped with an appropriate rotary bearing to enable rotor's rotation with respect to the stator.

Alongside roller bearings which have been in use for a long period of time, hydrodynamic bearings are now finding increasing application. A hydrodynamic bearing is an improvement on a journal bearing which consists of a bearing sleeve having a cylindrical inner bearing surface and a shaft having a cylindrical outer bearing surface set into the sleeve. The outer diameter of the shaft is only slightly smaller than the inner diameter of the sleeve, thus creating a radial bearing gap between the two bearing surfaces. The bearing gap is filled with a lubricant, preferably oil, forming a continuous capillary film.

To prevent bearing oil from escaping from the hydrodynamic bearing, one end face of the bearing sleeve is sealed with an airtight seal. At the opposite open end, a concentric area, having, for example, a conical contact surface, can be formed between the shaft and the inner surface of the bearing sleeve. The resulting tapered area functions as both a lubricant reservoir and an oil expansion volume. This tapered area also takes on the function of sealing the bearing. Under the influence of capillary forces, the oil in the area between the shaft and the conical surface of the bearing sleeve forms a stable, continuous liquid film. Therefore, such a seal is typically called a capillary seal.

Such a solution is described in U.S. Pat. No. 5,667,309. Here, a bearing sleeve is disclosed featuring a conical area at its top open end, wherein a concentric tapered area with a rotationally symmetric cross-section is created between the shaft and the bearing sleeve. Bearing oil is contained at the lower end of this tapered area, in direct extension of the bearing gap. The quantity of the bearing oil is so calculated that despite the vaporization of the bearing oil, the bearing gap is always sufficiently filled with bearing oil and seizure of the bearing due to dry running is prevented. The "free" volume of the tapered area, i.e. the volume not filled with bearing fluid, functions as an expansion volume which can be at least partially filled with bearing fluid escaping from the bearing gap due to the fluid volume expansion with a rise in temperature. The concentric tapered area can thus be described as a kind of "overflow" volume which at the same time functions as a lubricant reservoir. The disadvantage of this, in itself simple, solution is that the sealing effect of this tapered area diminishes due to the outward extending cross-section and, as a consequence, its retention capability of bearing oil also diminishes. Thus, the potential risk that oil is splashed out under axial shock again increases.

A further disadvantage of this known solution is that the useful length of the bearing, and consequently the bearing stiffness, is reduced by the overall axial length of the concentric tapered area conceived as, the capillary seal. Here, the overall axial height of the seal cone and the related angle of inclination have to be adjusted to the filling volume and the viscosity of the bearing oil. Low viscosity bearing oils need a more acute angle and thus a larger overall length for the same filling volume.

However, since one of the most important criteria for the suitability of hydrodynamic bearings in hard disk drives is the lowest possible bearing power loss, particularly for deployment in portable devices, efforts are made to use bearing oils with the lowest possible viscosity. A capillary seal of the art described adapted to lower viscosity would consequently need a longer overall length which accordingly would have a negative impact on the effective bearing length. Dimensioning a hydrodynamic radial bearing with sufficient stiffness is consequently severely limited, and for very small-scale spindle motors no longer possible under certain circumstances.

SUMMARY

It is thus an object of the invention to provide a hydrodynamic bearing with an appropriate, non-contact seal which has the least possible power loss, extensive bearing stiffness and a long lifespan.

The invention provides a hydrodynamic bearing for a spindle motor having a shaft and a bearing sleeve. One of the shaft ends is fixedly connected to a rotor of the motor, and the other end of the shaft is encompassed by the bearing sleeve with only slight radial clearance. Due to the slight difference in an outer diameter of the shaft and an inner diameter of the bearing sleeve, a concentric bearing gap is formed which is filled with a bearing fluid. In the area of the bearing gap, at least one radial bearing section is formed on the outer surface of the shaft and/or on the cylindrical inner surface of the bearing sleeve. As known in the prior art, the radial bearing section is formed by providing a groove pattern on the inner surface of the bearing sleeve or the outer surface of the shaft.

In the hydrodynamic bearing according to the invention, an equalizing volume cavity dependent on the length of the bearing gap of the hydrodynamic bearing is particularly provided for the bearing fluid. The equalizing volume cavity also functions as a lubricant reservoir for vaporizing bearing fluid and an "overflow" or expansion volume into which the bearing fluid can expand when its volume increases as the temperature rises due to differences in the thermal expansion coefficients. According to the invention, this equalizing volume cavity is connected by at least one connecting passage, in particular a micro-passage, to the bearing gap. The connecting passage leads radially outwards at an angle to the rotational axis.

The equalizing volume cavity is not arranged along the useful bearing length at the outer end of the bearing gap, but rather is set radially outwards and is connected to the bearing gap via the micro- passage. This means that the bearing sleeve can be formed along the entire length of the bearing with an unchanged diameter so that a bearing gap with a maximum useful length results. Consequently, at least one radial bearing can be provided directly adjoining the open end of the bearing sleeve, so that when arranged in pairs, the largest possible interval between both hydrodynamic radial bearings can be utilized thus achieving maximum bearing stiffness.

Because the equalizing volume cavity is placed outside the bearing gap and connected to it by a micro-passage, the risk that bearing oil could be splashed out under axial shock is considerably reduced significantly increasing both functional reliability and lifespan of the bearing.

In one embodiment of the invention, the micro-passage directly adjoins the radial bearing section in the bearing gap. In another embodiment of the invention, the micro-passage is indirectly connected to the radial bearing via an axial section of the bearing gap. Essential for both embodiments is that a capillary connection is formed between the radial bearing section and the micro-passage so that the bearing fluid forms a continuous capillary film from the radial bearing in the bearing gap via the micro-passage to the equalizing volume cavity.

The micro-passage and adjoining equalizing volume cavity are preferably wholly or partially formed in the bearing sleeve. The micro-passage extends from the inner diameter of the bearing sleeve leading into the equalizing volume cavity. In a particularly beneficial embodiment of the invention, the micro-passage is formed as a capillary annulus gap circling the inner diameter of the bearing sleeve and connecting the radial bearing section with the equalizing volume cavity whose radial extension runs essentially vertical to the rotational axis of the bearing. The micro-passage can form an angle with the rotational axis of approximately 30° to 90° and in particular an angle of about 90°.

The equalizing volume cavity may be formed at the top area of the bearing sleeve, preferably, as a rotationally symmetric gap whose width increases with the distance away from the rotational axis. The narrowest inner cross-sectional area may be connected directly to the bearing gap via the adjoining micro-passage. The wider cross-sectional area is then arranged in close proximity to the edge of the bearing sleeve facing away from the bearing gap. When the equalizing volume cavity is designed in this way, the micro-passage can be formed by means of a tapering section at the radial inner end of the equalizing volume cavity, directly adjoining the bearing gap.

For fault-free operation, the equalizing volume cavity is preferably connected with the environment by a ventilation opening whereby the ventilation opening is formed, for example, as a part of an interconnected thread.

In a particularly beneficial embodiment of the invention, the gap intended as an equalizing volume cavity and formed in the top end surface of the bearing sleeve is given a truncated conical form and covered with an annular plate or an appropriately formed cap so that an equalizing volume cavity with the desired form is created between the cover plate and the beveled end. Any other kind of depression having an appropriate shape can also be formed at the top end of the bearing sleeve which, in combination with the cover plate, forms the equalizing volume cavity. The micro-passage on this same bearing sleeve end is created by the existence, at least in sections, of a very small space, a matter of micrometers, between the cover plate or the cup bottom and the opposing bearing sleeve end.

If a shoulder is provided on the shaft in the area at the top of the bearing sleeve, this shoulder can radially overlapp, at least in part, with the bearing sleeve itself or an appropriately formed cover plate so that a kind of labyrinth seal with an additional sealing effect is created.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF DRAWINGS

The invention is illustrated by way of example and not limitation and the figures of the accompanying drawings in which like references denote like or corresponding parts, and in which:

FIG. 1b is a partial cut-out view of a modified embodiment of the hydrodynamic bearing in FIG. 1a;

FIG. 2b is a schematic longitudinal sectional view of a modified embodiment of the hydrodynamic bearing in FIG. 2a;

FIG. 3b is a sectioned longitudinal view of a modification of the embodiment of the hydrodynamic bearing in FIG. 3a;

FIG. 3c is a partial cut-out view of another modification of the embodiment of the hydrodynamic bearing in FIG. 3a;

FIG. 4b is a partial cut-out view of a modification of the embodiment of the hydrodynamic bearing in FIG. 4a;

FIG. 4c is a schematic longitudinal sectional view of another modification of the embodiment of the hydrodynamic bearing in FIG. 4a;

DETAILED DESCRIPTION

In the figures, corresponding components are denoted with the same reference numbers.

Figure 1C:
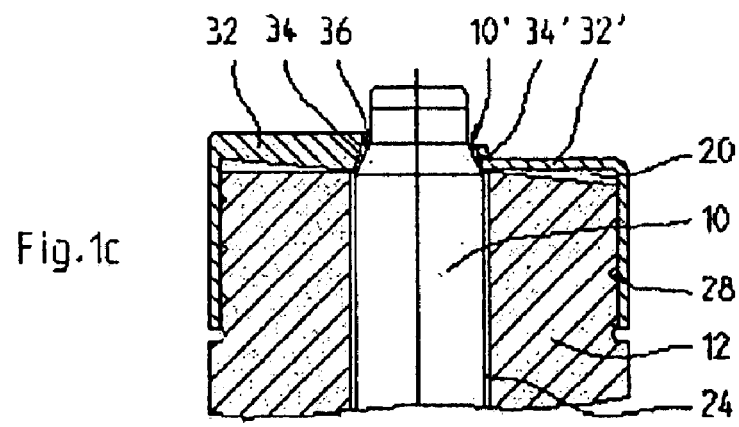
FIG. 1c is a partial cut-out view of two further modifications of the hydrodynamic bearing in FIG. 1a, each as a half section, shown in the figure to the right and left of the rotational axis.
Figure 1B:
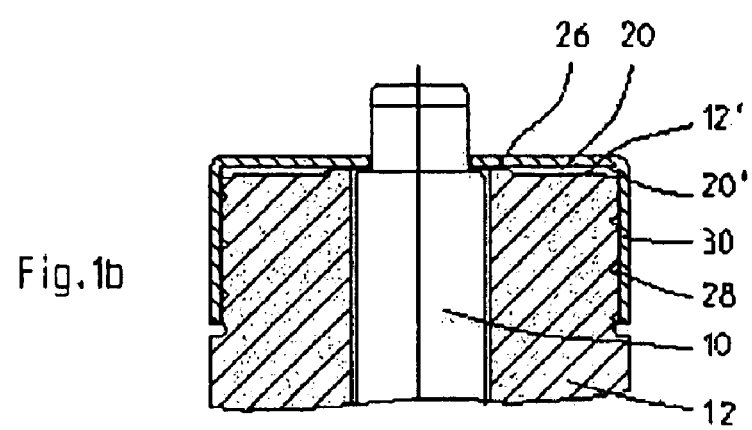
Figure 1A:
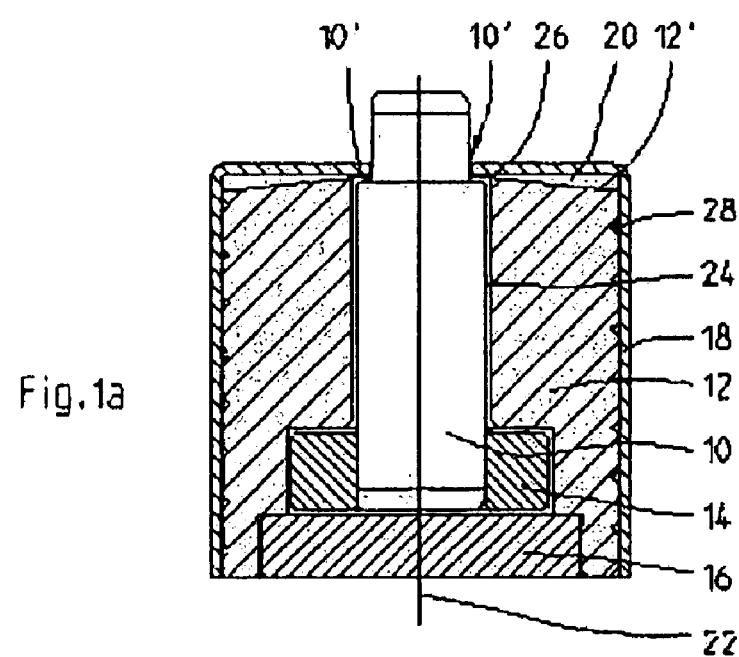
FIG. 1a is a schematic longitudinal sectional view of a first embodiment of a hydrodynamic bearing according to the invention.

FIG. 1a shows a schematic longitudinal section through a hydrodynamic bearing according to a first embodiment of the invention.

The hydrodynamic bearing shown in FIG. 1a includes a shaft 10, which is accommodated for rotation in a cylindrical bearing sleeve 12. The shaft 10 features a thrust plate 14 at the end enclosed by the bearing sleeve. The bearing sleeve 12 is sealed at this end by a counter plate 16 which takes up the axial bearing load exerted on the shaft 10 via the thrust plate 14.

At its other end 10', the shaft 10 protrudes from the bearing sleeve 12. The bearing sleeve 12 is sealed at this end by a cap 18 lapping over a shoulder 10" of the shaft 10 and forming a labyrinth seal with the shaft by means of this radial overlapping.

The bearing sleeve 12 is conically beveled at one of its ends 12'. In the illustrated embodiment, an equalizing volume cavity 20 is formed between the cap 18 encompassing the sleeve and the beveled top end 12' of the bearing sleeve 12. The resulting equalizing volume cavity extends in a plane essentially perpendicular to the rotational axis 22 of the hydrodynamic bearing and widens radially outwards.

A bearing gap 24 is formed between shaft 10 and bearing sleeve 12. The bearing gap is connected via a connecting passage, particularly a micro-passage 26 at the top end of the bearing sleeve 12, with the equalizing volume cavity 20. Micro-passage 26 maintains the capillary connection between the bearing gap 24 and the equalizing volume cavity 20. The micro-passage is formed as a rotationally symmetric annular gap and is formed by placing the inside bottom of the cap 18 directly onto the raised annular area at the top end 12' of the bearing sleeve 12, preferably without any intermediate gap or with a gap measured in micrometers.

The equalizing volume cavity 20 is connected to the environment via a ventilation opening 28. In the embodiment shown in FIG. 1a, the ventilation opening 28 is formed by screw-shaped threading.

In the illustrated embodiment, radial bearing sections (not illustrated) are preferably formed on the inner cylindrical surface of the bearing sleeve 12 by providing a groove pattern on the inner cylindrical surface. In addition, in the area of the thrust plate 14 and the counter plate 16, axial bearing sections can be formed using any known method. Since the equalizing volume cavity 20 and the micro-passage 26 connecting the bearing gap 24 with the equalizing volume cavity 20 are formed at the top end 12' of the bearing sleeve 12, the entire length of the bearing sleeve 12 is available for one or more radial bearings to be formed. In particular, two radial bearing sections can be formed on the respective end sections of the bearing sleeve 12 with maximum space between one another so that maximum bearing stiffness can be achieved.

After the hydrodynamic bearing presented in the invention is mounted, the bearing gap 24 and a part of the equalizing volume cavity 20 are filled with bearing fluid, preferably with a bearing oil. The filling ratio for filling the equalizing volume cavity 20 with fluid is so chosen as to enable sufficient amount of lubricant to be introduced to ensure continuous lubrication of the hydrodynamic bearing over its entire lifespan. On the other hand, enough space must be left in the unfilled part of the equalizing volume cavity 20 to enable the bearing fluid to expand into it when the overall volume of the fluid increases after a rise in temperature during operation due to differences in thermal expansion coefficients. This space will become concentrated with gaseous bearing fluid due to the vaporization rate of the bearing fluid, wherein as the saturation rate increases, the vaporization rate slows down. To ensure that no pressure differences can build up in the equalizing volume cavity, thus leading to the capillary film tearing, the equalizing volume cavity is connected to the surrounding air or the surrounding air-pressure via the ventilation opening 28. The gap between the shaft shoulder 10" and the cap 18 forms an additional labyrinth seal.

The rim of the cap 18 lapping over the shaft shoulder 10" gives the hydrodynamic bearing an added protection against any bearing fluid splashing out when exposed to shock. In the embodiment shown in FIG. 1a, the bearing fluid fills the bearing gap 24 fully and the equalizing volume cavity 20 partially, but does not enter into the ventilation passage 28, i.e. into the threading. In other embodiments, an appropriately designed ventilation opening, also taking the form of threading or a thread, can also function, at least partly, as an additional reservoir and equalizing volume cavity.

In the illustrated embodiment, the shaft 10 and the bearing sleeve 12 can be made of steel and the cap 18 of aluminum or steel, whereby a person skilled in the art can use other appropriate materials depending on the specific requirements.

FIG. 1b shows a partial cut view of a modification of FIG. 1a, wherein the corresponding parts are denoted with the same identification references. The embodiment in FIG. 1b differs from FIG. 1a in that the cap 30 is smaller and does not encompass the whole bearing sleeve 12. This modification can have advantages for production purposes.

Moreover, in the embodiment of FIG. 1b the top end 12' of the bearing sleeve 12 is not shaped as a simple bevel but rather features a somewhat longer micro-passage 26 joined to a step leading to the widened reservoir 20 which transforms into a concentric encircling bevel 20' at its outer end.

FIG. 1c shows a further modification of the embodiment of the hydrodynamic bearing in FIG. 1a. This embodiment also differs from the embodiment in FIG. 1a in that the cap 32, 32' has a shorter side wall and does not encompass the bearing sleeve 12 over its entire length. This results in a shorter ventilation passage 28.

In addition, the embodiment in FIG. 1c differs from the embodiments shown in. FIGS. 1a and 1b in that the shoulder at the end 10' of the shaft 10 is beveled. Additionally, a concentric annular gap 36 with conic contact surfaces is formed between the beveled end 10' of the shaft 10 and the open end 34, 34' of the cap 32. This annular gap 36 is not a reservoir for the bearing fluid but can function instead as a small, supplementary equalizing volume cavity. When bearing fluid rises due to centrifugal forces created by the rotation of the shaft 10 the annular gap 36 functions to press the fluid downwards and outwards forcing it to flow back into the equalizing volume cavity 20.

Figure 2B:
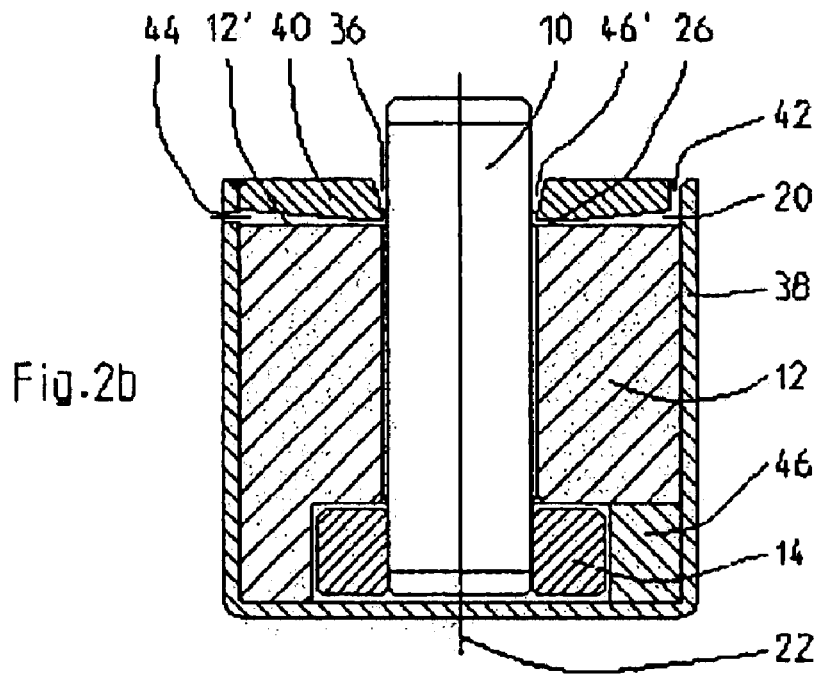
Figure 2A:
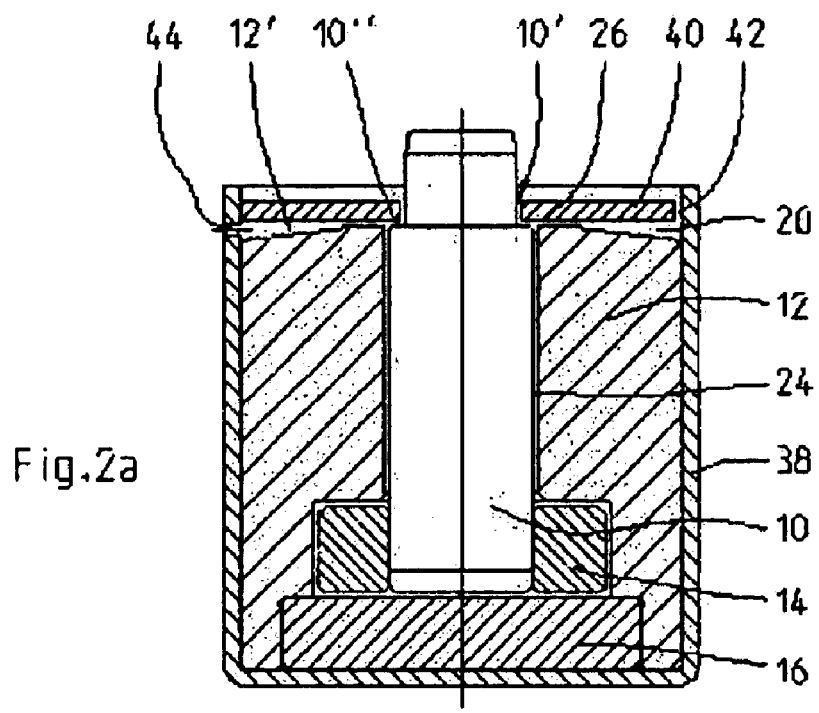
FIG. 2a is a schematic longitudinal sectional view of a further embodiment of the hydrodynamic bearing according to the invention.

FIG. 2a shows a schematic longitudinal section of a further embodiment of the hydrodynamic bearing according to the invention. Corresponding components are denoted with the same identification references as in FIG. 1.

The embodiment shown in FIG. 2a corresponds extensively with FIG. 1a in terms of the design of the shaft 10, bearing sleeve 12, thrust plate 14 and counter plate 16. A bearing gap 24 is formed between the shaft 10 and bearing sleeve 12, in which radial bearing sections (not illustrated) are formed as known in the art. Axial bearings are provided in the area of the thrust plate 14 and the counter plate 16.

In the embodiment in FIG. 2a, a can-shaped housing 38 encloses the bearing sleeve 12 adjacently to the counter plate 16. The bearing can be formed in the can-shaped housing 38. At its open end, associated with the end 10' of the shaft 10, the can-shaped housing 38 is sealed by a cover plate or cap 40. Cover plate 40 has essentially the same function as the bottom of the cap 18 in FIG. 1a. The equalizing volume cavity 20 is formed between the cover plate 40 and the beveled end 12' of the bearing sleeve 12. This equalizing volume cavity 20 can be connected to the environment by an axial recess or bore 42 and/or a radial bore 44, which function as a ventilation opening.

The function of the hydrodynamic bearing in FIG. 2a essentially corresponds to that of the embodiments described above. For production purposes, it could be of benefit to form the can-shaped housing 38, as shown in FIG. 2a, as a bearing housing in which the bearing is formed. The bearing housing 38 is then sealed by the cover plate 40 which can be connected to it by being pressed in, bonded, screwed in or suchlike. The axial and/or radial bores 42, 44 which are used to ventilate the equalizing volume cavity 20 essentially perform the same function as the ventilation opening 28, shown in FIG. 1. For the remaining functions, the explanation given in reference to FIG. 1 applies.

FIG. 2b shows a longitudinal view of a modification of the hydrodynamic bearing according to the embodiment in FIG. 2a. Similar to FIG. 2a, the shaft 10 and the bearing sleeve 12 are arranged in a can-shaped housing 38 which functions as a bearing housing. In the embodiment in FIG. 2b the shaft 10 is provided with a thrust plate 14 at the end enclosed by the can-shaped housing 38. A separate counter plate is not provided in this embodiment as the function of the counter plate is performed by the bottom of the can-shaped housing 38. Shaft 10 and thrust plate 14 can be enclosed by the bearing sleeve 12 over the entire axial length of the hydrodynamic bearing, as shown in FIG. 2b to the left of the rotational axis 22. Alternatively, the sleeve 12 can also be set into the can-shaped housing 38 with the interposition of a spacer ring 46, so that the structure to the right of the rotational axis 22 in FIG. 2b is produced. This can have advantages for production because manufacture of such bearing sleeve 12 is less costly. In addition, the bearing gap 24 in the area of the axial bearing can be precisely adjusted through the appropriate selection or pairing of thrust plate 14 and spacer ring 46. The modification shown to the right of the rotational axis 22 in FIG. 2b can of course be equally applied to other embodiments of the invention described in this specification.

Another difference between the embodiments in FIGS. 2a and 2b is that the shaft 10 does not feature a shoulder in the embodiment in FIG. 2b. Therefore, no supplementary labyrinth seal is formed. A further difference between the two embodiments in FIGS. 2a and 2b is that the central opening 46' in the cover plate 40 accommodating shaft 10 is beveled in such a way that a concentric annular gap 36 is formed between the shaft 10 and the central opening 46', as shown in the embodiment in FIG. 2b. The function of the conical annular gap 36 essentially corresponds to the function of the annular gap 36 in FIG. 1c.

Again in the embodiment in FIG. 2b, axial and radial bores 42, 44 are provided as ventilation openings. An equalizing volume cavity 20 and a micro-passage 26 are formed between the cover plate 40 and the top 12' of the bearing sleeve. Functions of the equalizing volume cavity 20 and the micro-passage 26 are described above with reference to FIG. 2a and the previous figures.

In the embodiments shown in FIGS. 2a and 2b, if the can-shaped housing 38 is made, for example, of aluminum and the shaft 10 and the bearing sleeve 12 are made of steel, a hydrodynamic bearing may be formed in the can-shaped housing 38 when it is warm. After cooling, the can-shaped housing 38 contracts to a greater extent than the other components of the bearing in such a manner that the hydrodynamic bearing is held in the can-shaped housing 38 in a shrink-fit connection.

Figure 3C:
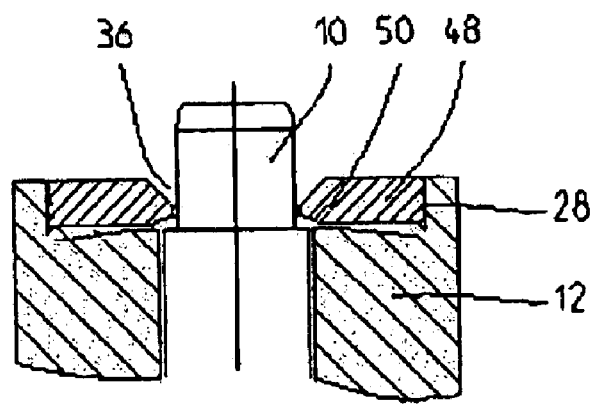
Figure 3B:
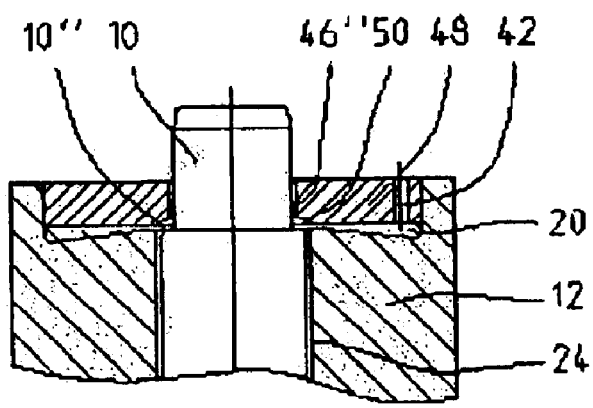
Figure 3A:
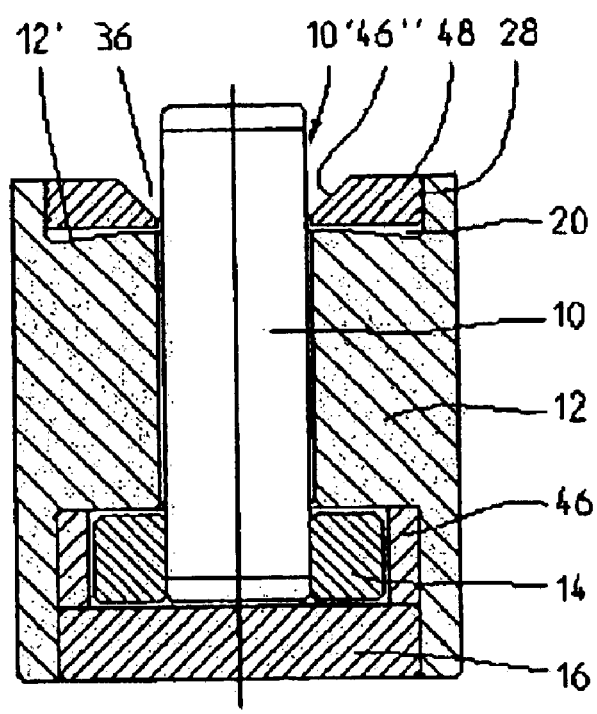
FIG. 3a is a schematic longitudinal sectional view of a further embodiment of the hydrodynamic bearing according to the invention.

FIG. 3a shows a schematic longitudinal section through a further embodiment of the hydrodynamic bearing according to the invention. The hydrodynamic bearing according to FIG. 3a includes a shaft 10 which ends in a thrust plate 14 located opposite a counter plate 16. Shaft 10, thrust plate 14 and counter plate 16 are enclosed by a bearing sleeve 12. Bearing sleeve 12 features a recess at its lower end to accommodate a thrust plate 14, spacer ring 46 and counter plate 16. Here again, as described above with respect to FIG. 2b, the function of the spacer ring 46 is to aid the axial adjustment of the bearing gap 24 in the area of the axial bearing. At the open end 12' of the bearing sleeve, which is associated with the end 10' of the shaft, a recess is provided in the bearing sleeve in which a cover plate or a cap 48 is placed. The cover plate 48 together with the top end 12' of the bearing sleeve 12, encloses the equalizing volume cavity 20. A ventilation opening 28 for the equalizing volume cavity 20 is formed by a thread-like formation on the outer diameter of the cap 48. A ventilation opening 28 taking the form of such a thread increases the certainty that no bearing fluid will escape when exposed to shock compared to a simple axial bore, as provided in the embodiments of FIGS. 2a and 2b. In a similar way as in the embodiment in FIG. 2b, a bevel is provided on the inner radial central opening 46" in the cap 48. The bevel together with the shaft 10 bounds the concentric annular gap 36 which can function as a supplementary equalizing volume cavity, where required, but is on no account intended as a lubricant reservoir. The bevel on the inside of the central opening 46" is preferably equal to or more than 45°.

FIGS. 3b and 3c show further modifications of the hydrodynamic bearing according to FIG. 3a. The embodiment in FIG. 3b differs from FIG. 3a in that the shaft 10 features a shoulder 10" overlapping with the cap 48. Instead of a thread or threading, the embodiment in FIG. 3b provides for a simple axial bore 42 to ventilate the equalizing volume cavity 20. Moreover, the cap 48 adjoining the central opening 46" is again slightly beveled at the inner surface facing the bearing to support the flow back of any bearing fluid which has risen to escape through the central opening 46". The small chamfer 50 thus formed supports centrifugal forces exerted on the bearing fluid by the rotation of the shaft 10 and consequently the flow back of bearing fluid into the equalizing volume cavity 20.

The embodiment in FIG. 3c differs from FIG. 3b by the threadlike design of the ventilation opening 28 and by the concentric annular gap 36 both of which have already been described with reference to FIG. 3a.

Figure 4B:
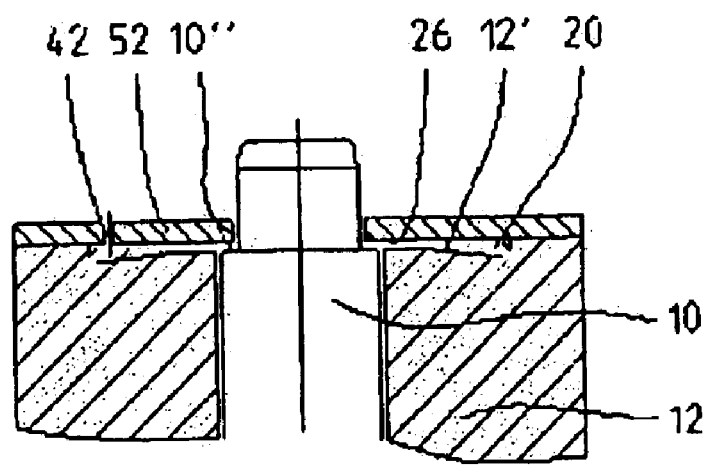
Figure 4A:
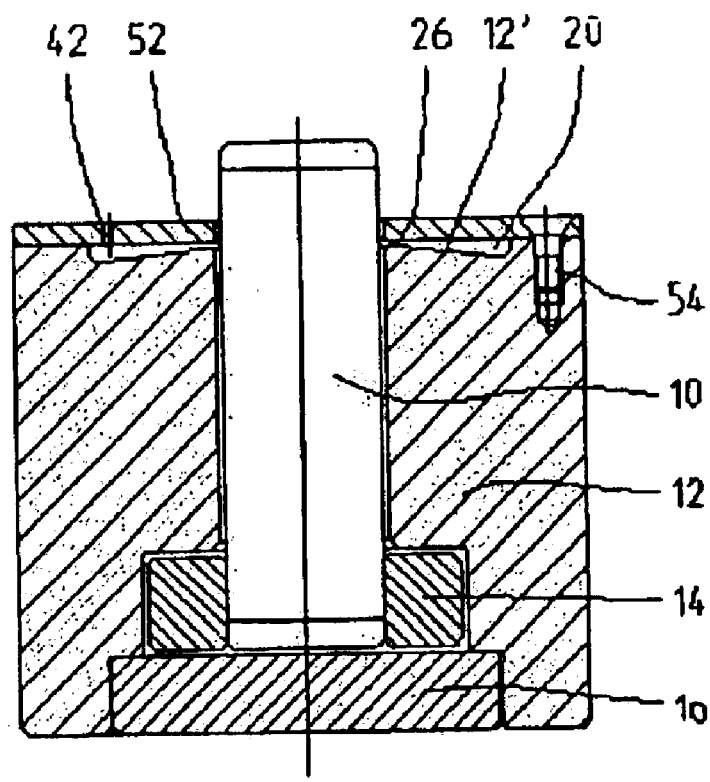
FIG. 4a is a schematic longitudinal sectional view of a further embodiment of a hydrodynamic bearing according to the invention.
Figure 4C:
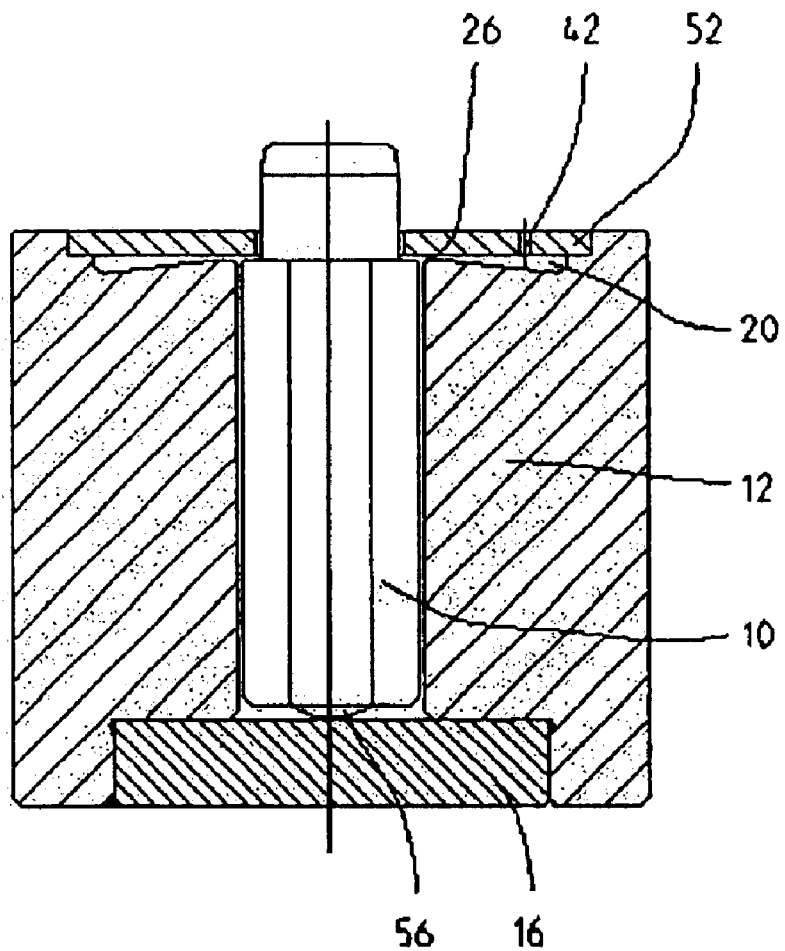

A further group of embodiments of the hydrodynamic bearing according to the invention are illustrated in FIGS. 4a, 4b and 4c.

As shown in FIG. 4a, the hydrodynamic bearing includes a shaft 10 with a thrust plate 14 and a counter plate 16 which are encompassed by a bearing sleeve 12. The embodiment in FIG. 4a corresponds essentially to FIG. 3a, wherein, however, the function of the spacer ring is adopted by an appropriately designed bearing sleeve 12. The top end 12' of the bearing sleeve is provided with depressions to form the equalizing volume cavity 20 and sealed by a cover plate or a cap 52. The equalizing volume cavity 20 is formed between the recess on the top end 12' of the bearing sleeve 12 and the cover plate 52. The cover plate 52 is connected by screws 54, by bonding or by any other appropriate means to the bearing sleeve 12. In the embodiment in FIG. 4a, an axial bore 42 is provided in the cover plate 52 which is used to ventilate the equalizing volume cavity.

The function of the hydrodynamic bearing in FIG. 4a is essentially the same as described with reference to FIG. 1a and the other figures. However, the embodiment in FIG. 4a can be particularly beneficial for production purposes since it provides a simply designed, easily realized hydrodynamic bearing which does not require a can-shaped housing and in which a cover plate 52, taking the form of a simple disk, can be set on the top end 12' of the bearing sleeve 12 in order to form the equalizing volume cavity 20 and the micro-passage 26.

A modification is shown in FIG. 4b. This modification differs from the embodiment in FIG. 4a in that the shaft 10 features a shoulder 10" overlapping with the cover plate 52 so that a supplementary labyrinth seal is formed.

FIG. 4c shows a further development of the hydrodynamic bearing according to FIG. 4b in which the axial bearing at the sealed end of the shaft 10 opposing the counter plate 16 is formed as a pivot-type bearing 56. A pivot-type bearing, as shown in FIG. 4c, as well as other embodiments of similar types of axial bearings, can, of course, be provided in the embodiments of the hydrodynamic bearing described above instead of the thrust plate 14.

Functions of the equalizing volume cavity 20, micro-passage 26 and ventilation passages 28, 42 are essentially the same in the various embodiments outlined. For production purposes or to achieve the supplementary functions described above, it could, however, be beneficial to modify one or the other embodiment of the invention.

Figure 5:
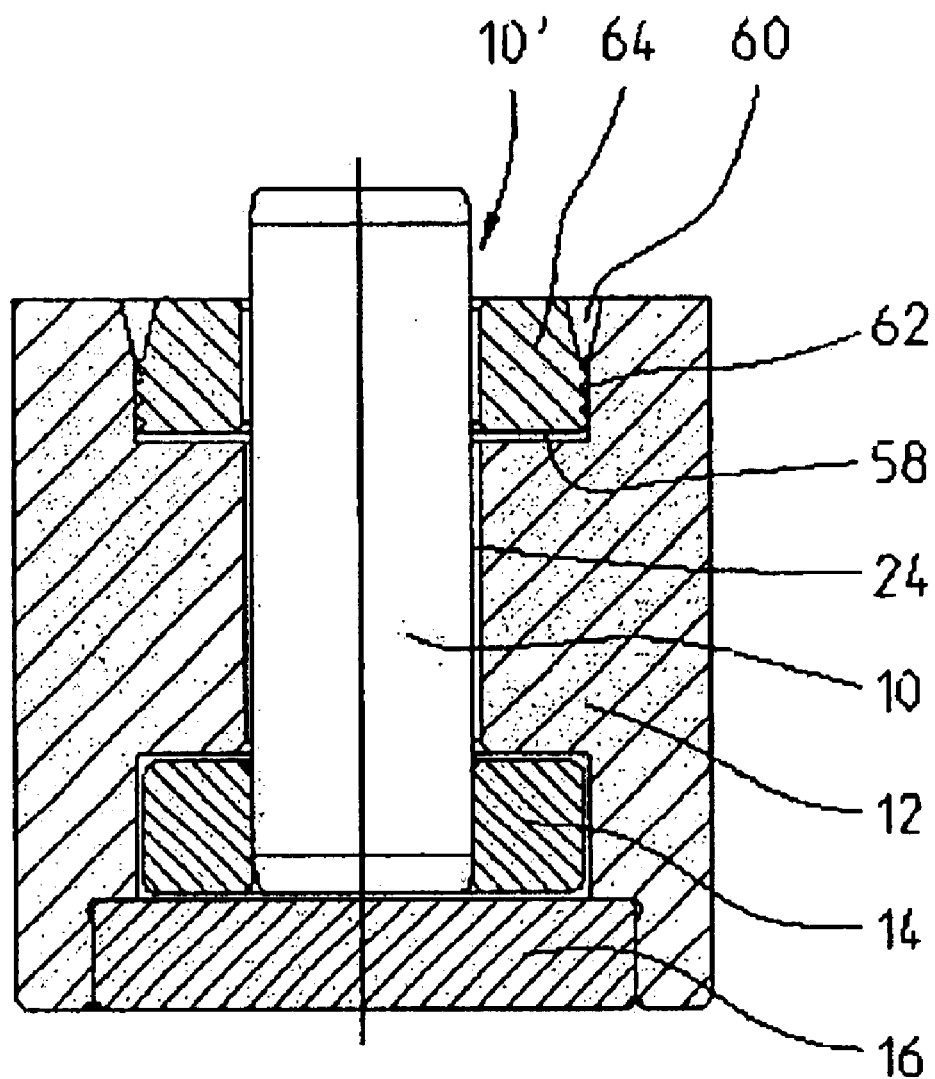
FIG. 5 is a schematic longitudinal sectional view of a further embodiment of the hydrodynamic bearing according to the invention.
Figure 6:
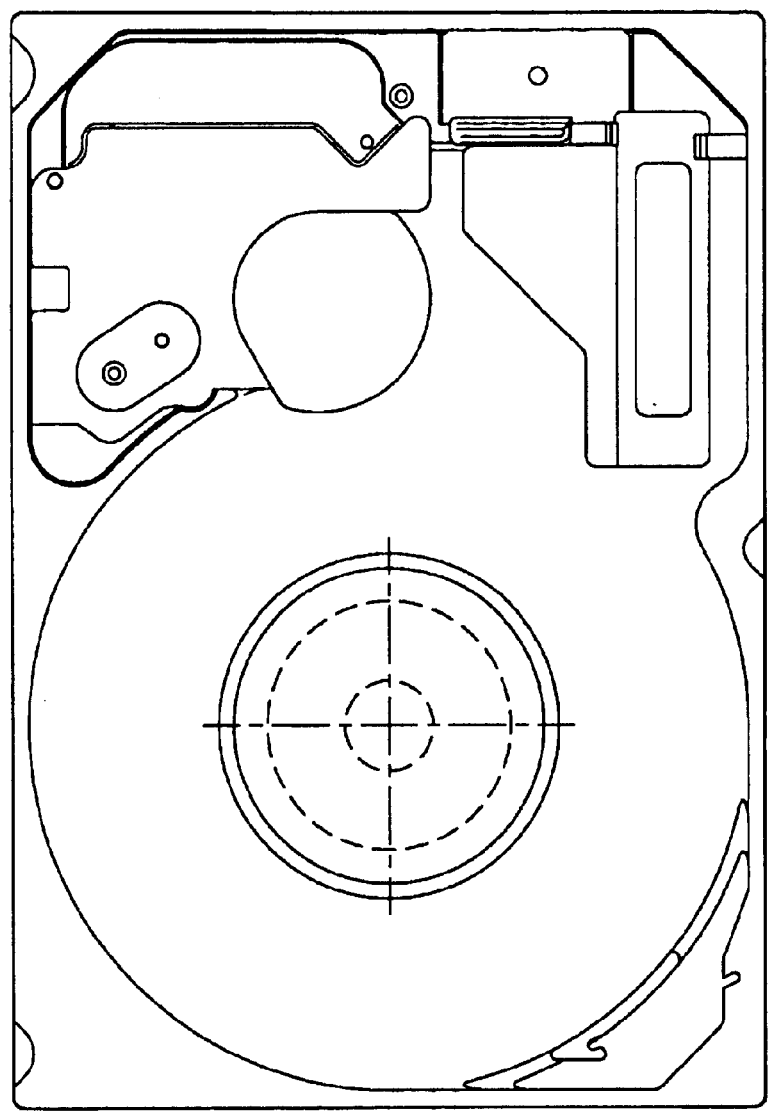
FIG. 6 is a schematic view of a hydrodynamic bearing being incorporated into a spindle motor of a hard disk drive.

Finally, another embodiment of the hydrodynamic bearing according to the invention is shown in FIG. 5. The longitudinal view in FIG. 5 shows a shaft 10, with a thrust plate 14 at its sealed end and a counter plate 16 which are enclosed and held by a bearing sleeve 12. A bearing gap 24 is formed between the bearing sleeve 12 and shaft 10. The micro-passage 58, formed as an annular gap, connects the bearing gap 24 with a concentrically arranged, v-shaped equalizing volume cavity 60. The micro-passage 58 and the equalizing volume cavity 60 are formed by the bearing sleeve 12 having a recess 62 at its open end, into which a ring 64 is inserted, set or screwed.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent. The hydrodynamic bearing according to the invention is particularly suitable for use in a spindle motor and more particularly in a spindle motor for a hard disk drive which operates at a high rpm speed and has low power consumption.

What is claimed is:

1. A hydrodynamic bearing comprising:
   a rotating shaft;
   a bearing sleeve encompassing one of the shaft's free ends with a slight radial clearance;
   a concentric bearing gap formed between the shaft and the bearing sleeve;
   at least one groove pattern provided on one of the rotating shaft and the bearing sleeve, the groove pattern forming at least one radial bearing;
   a rotational axis;
   an equalizing volume cavity; and
   at least one connecting passage connecting the bearing gap with the equalizing volume cavity,
   wherein the connecting passage extends radially outwards at an angle to the rotational axis, wherein the equalizing volume cavity is connected to the environment by a ventilation passage; and wherein the ventilation passage is formed as a screw-shaped thread.

2. The hydrodynamic bearing according to claim 1, wherein the connecting passage directly or indirectly adjoins at least one of the bearing gap and the radial bearing.

3. The hydrodynamic bearing according to claim 1, further comprising a bearing fluid completely filling the bearing gap and at least one connecting passage, and at least partially filling the equalizing volume cavity, wherein the bearing fluid forms a continuous capillary film between the bearing gap and the equalizing volume cavity.

4. The hydrodynamic bearing according to claim 1, wherein the connecting passage is a least partly formed within the bearing sleeve.

5. The hydrodynamic bearing according to claim 1, wherein the connecting passage further comprises at least one contact surface extending in a substantially radial direction from an end surface of the bearing sleeve.

6. The hydrodynamic bearing according to claim 1, wherein the connecting passage further comprises at least one contact surface extending in at least one of an axial and a radial direction from an end surface of the bearing sleeve.

7. The hydrodynamic bearing according to claim 1, further comprising a supplementary annular component, wherein the connecting passage further comprises at least one contact surface formed by an end surface of the supplementary annular component.

8. The hydrodynamic bearing according to claim 1, further comprising a cup-shaped component, wherein the connecting passage further comprises at least one contact surface formed by a bottom of the cup-shaped component.

9. The hydrodynamic bearing according to claim 1, further comprising a supplementary annular component, wherein the connecting passage further comprises at least one contact surface formed by an outer sheath surface of the supplementary annular component.

10. The hydrodynamic bearing according to claim 1, wherein the connecting passage extends from an inner diameter of the bearing sleeve to the equalizing volume cavity.

11. The hydrodynamic bearing according to claim 1, wherein the connecting passage circles an inner diameter of the bearing sleeve and forms a capillary annular gap.

12. The hydrodynamic bearing according to claim 1, wherein the connecting passage extends radially outwards and at least one of its contact surfaces forms an angle $\alpha$ with the rotational axis of the bearing, the angle $\alpha$ being greater or equal to zero.

13. The hydrodynamic bearing according to claim 12, wherein the angle $\alpha$ is within the range of $90°\pm60°$.

14. The hydrodynamic bearing according to claim 12, wherein the angle $\alpha$ is about $90°$.

15. The hydrodynamic bearing according to claim 1, wherein the equalizing volume cavity is at least partly formed in the bearing sleeve.

16. The hydrodynamic bearing according to claim 1, wherein the equalizing volume cavity is formed as a rotationally symmetric cavity with a v-shaped cross-section which is connected to the bearing gap via the connecting passage.

17. The hydrodynamic bearing according to claim 1, wherein the equalizing volume cavity is formed as an annular space open on one side-with a v-shaped cross-section which is positioned concentric to the shaft with a radial clearance from the shaft.

18. The hydrodynamic bearing according to claim 1, wherein the equalizing volume cavity extends substantially in a radial direction and further comprises contact surfaces diverging from the inside towards the outside.

19. The hydrodynamic bearing according to claim 1, wherein the connecting passage is formed by a tapering section of the equalizing volume cavity, the tapering section adjoining the bearing gap.

20. The hydrodynamic bearing according to claim 1, wherein one end of the bearing sleeve is beveled and the equalizing volume cavity is formed between the beveled end and a cover plate placed onto the beveled end.

21. The hydrodynamic bearing according to claim 1 further comprising a cover plate, wherein the shaft further comprises a shoulder located in close proximity to one end of the bearing sleeve, and wherein the cover plate at least partly overlaps the shoulder.

22. A spindle motor having a hydrodynamic bearing, the hydrodynamic bearing comprising:

a rotating shaft;

a bearing sleeve encompassing one of the shaft's free ends with a slight radial clearance;

a concentric bearing gap formed between the shaft and the bearing sleeve;

at least one groove pattern provided on one of the rotating shaft and the bearing sleeve, the groove pattern forming at least one radial bearing;

a rotational axis;

an equalizing volume cavity; and at least one connecting passage connecting the bearing gap with the equalizing volume cavity, wherein the connecting passage extends radially outwards at an angle to the rotational axis, wherein the equalizing volume cavity is connected to the environment by a ventilation passage; and wherein the ventilation passage is formed as a screw-shaped thread.

23. A hard disk drive with a spindle motor having a hydrodynamic bearing, the hydrodynamic bearing comprising:

a rotating shaft;

a bearing sleeve encompassing one of the shaft's free ends with a slight radial clearance;

a concentric bearing gap formed between the shaft and the bearing sleeve;

at least one groove pattern provided on one of the rotating shaft and the bearing sleeve, the groove pattern forming at least one radial bearing;

a rotational axis;

an equalizing volume cavity; and at least one connecting passage connecting the bearing gap with the equalizing volume cavity, wherein the connecting passage extends radially outwards at an angle to the rotational axis, wherein the equalizing volume cavity is connected to the environment by a ventilation passage; and wherein the ventilation passage is formed as a screw-shaped thread.

* * * * *